United States Patent
Vicente, Jr. et al.

(10) Patent No.: US 8,550,449 B2
(45) Date of Patent: Oct. 8, 2013

(54) GEAR CLUTCH ASSEMBLY AND ELECTRONIC DEVICE USING THE SAME

(75) Inventors: Domingo Abao Vicente, Jr., Singapore (SG); Cher-Lek Toh, Singapore (SG); Michael Medrano Recinto, Singapore (SG); Harold Magtibay Cabral, Singapore (SG)

(73) Assignees: Cal-Comp Precision (Singapore) Limited, Singapore (SG); Cal-Comp Electronics & Communications Company Limited, New Taipei (TW)

(*) Notice: Subject to any disclaimer, the term of this patent is extended or adjusted under 35 U.S.C. 154(b) by 0 days.

(21) Appl. No.: 13/468,026

(22) Filed: May 9, 2012

(65) Prior Publication Data

US 2013/0126289 A1 May 23, 2013

(30) Foreign Application Priority Data

Nov. 22, 2011 (SG) .................. 201108657-6

(51) Int. Cl.
*B65H 3/06* (2006.01)
(52) U.S. Cl.
USPC .................................. 271/109; 192/46
(58) Field of Classification Search
USPC .................................. 271/109; 192/46
See application file for complete search history.

(56) References Cited

U.S. PATENT DOCUMENTS

| 4,754,961 | A | | 7/1988 | Tokuda et al. | |
|---|---|---|---|---|---|
| 5,000,721 | A | * | 3/1991 | Williams | 464/37 |
| 5,020,648 | A | * | 6/1991 | Bush et al. | 192/46 |
| 5,088,581 | A | * | 2/1992 | Duve | 192/46 |
| 5,472,287 | A | | 12/1995 | Hasegawa et al. | |
| 5,597,057 | A | * | 1/1997 | Ruth et al. | 192/46 |
| 5,678,668 | A | * | 10/1997 | Sink | 192/46 |
| 6,889,808 | B2 | * | 5/2005 | Robuck | 192/46 |
| 7,878,316 | B2 | * | 2/2011 | Joppeck | 192/46 |
| 2003/0085506 | A1 | * | 5/2003 | Kubo | 271/117 |
| 2004/0016616 | A1 | * | 1/2004 | Stefina | 192/46 |
| 2008/0169599 | A1 | | 7/2008 | Lam et al. | |
| 2009/0250303 | A1 | * | 10/2009 | Matsuzaki | 192/46 |

FOREIGN PATENT DOCUMENTS

| JP | 2009097595 | 5/2009 |
|---|---|---|
| TW | M313073 | 6/2007 |
| TW | 201020118 | 6/2010 |
| TW | 201024102 | 7/2010 |

OTHER PUBLICATIONS

"Search Report of Singapore Counterpart Application", issued on Feb. 1, 2013, p. 1-p. 10.

* cited by examiner

*Primary Examiner* — Kaitlin Joerger
*Assistant Examiner* — Ernesto Suarez
(74) *Attorney, Agent, or Firm* — Jianq Chyun IP Office

(57) ABSTRACT

A gear clutch assembly and an electronic device are provided. The gear clutch assembly comprises a pivot, a driving gear engaged with the pivot and adapted to rotate along the pivot, and a driven gear disposed on the driving gear. The driving gear comprises a first surface, a ratchet integrally formed with the driving gear comprising a plurality of teeth disposed on the first surface. The driving gear comprises a second surface facing the first surface, and a pawl integrally formed with the driven gear on the second surface. When the driving gear rotates in a driving direction, one of the teeth is engaged with the pawl and drives the driven gear to rotates with the driving gear. When the driving gear rotates in an opposite direction, every tooth pushes up and slides under the pawl so the driven gear does not rotate along with the driving gear.

13 Claims, 5 Drawing Sheets

GEAR CLUTCH ASSEMBLY AND ELECTRONIC DEVICE USING THE SAME

CROSS-REFERENCE TO RELATED APPLICATION

This application claims the priority benefit of Singapore application serial no. 201108657-6, filed on Nov. 22, 2011. The entirety of the above-mentioned patent application is hereby incorporated by reference herein and made a part of this specification.

BACKGROUND

Field of the Application

The unidirectional rotation device is configured to positively drive in one direction and provide substantially no torque in the other direction. The unidirectional rotation device is widely used in the industry fields, for example, the transmission devices for bicycles, paper feeding module for printers, etc.

Several types of the unidirectional rotation devices are well known. For instance, a ratchet clutch rotates a flexible or reciprocating pawl so that it sequentially passes a plurality of teeth when driven in one direction, or drivingly engages a single tooth when driven in the other direction. Also various cinching rollers are used to attain unidirectional driving forces. However, the assembling of the ratchet clutch is rather complicated, so the manufacturing cost is very high. The cost of the device using the ratchet clutch, therefore, is increased.

SUMMARY OF THE INVENTION

Accordingly, the present invention is directed to a gear clutch assembly wherein the driven gear thereof is configured to rotate unidirectionally.

The present invention is directed to an electronic device wherein the paper feed roller of the paper feed module is configured to rotate unidirectionally.

The present invention provides a gear clutch assembly comprising a pivot, a driving gear engaged with the pivot and adapted to rotate along the pivot, and a driven gear disposed on the driving gear. The driving gear comprises a first surface, a ratchet integrally formed with the driving gear comprising a plurality of teeth disposed on the first surface. The driving gear comprises a second surface facing the first surface, and at least a pawl integrally formed with the driven gear on the second surface. When the driving gear rotates in a driving direction, at least one of the teeth of the ratchet is engaged with the pawl and drives the driven gear to rotates with the driving gear. When the driving gear rotates in an opposite direction, every tooth pushes up and slides under the pawl so the driven gear does not rotate along with the driving gear.

The present invention provides an electronic device comprising a body and a paper feed module disposed in the body. The paper feed module comprises a paper tray for stacking papers thereon, a paper feed path connecting to the paper tray, and a gear clutch assembly disposed on the paper feed path. The gear clutch assembly comprises a pivot disposed in the body, a driving gear engaged with the pivot and adapted to rotate along the pivot, and a driven gear disposed on the driving gear. The driving gear comprises a first surface, a ratchet integrally formed with the driving gear comprising a plurality of teeth disposed on the first surface. The driving gear comprises a second surface facing the first surface, and at least a pawl integrally formed with the driven gear on the second surface. When the driving gear rotates in a driving direction, at least one of the teeth of the ratchet is engaged with the pawl and drives the driven gear to rotates with the driving gear. When the driving gear rotates in an opposite direction, every tooth pushes up and slides under the pawl so the driven gear does not rotate along with the driving gear.

According to an embodiment of the present invention, the ratchet and the driving gear described above are integrally formed by injection molding.

According to an embodiment of the present invention, the pawl and the driven gear described above are integrally formed by injection molding.

According to one embodiment of the present invention, the driving gear and the driven gear described above are made of plastic.

According to one embodiment of the present invention, every tooth described above comprises a curvy side and a straight side, and the pawl comprises a contact surface. The straight side of the tooth is adapted to engage with the contact surface and push the contact surface when the driving gear rotates in the driving direction. The curve side of the tooth is adapted to push up and slide under the pawl when the driving gear rotates in the opposite direction.

According to one embodiment of the present invention, the driving gear described above comprises a first through hole for engaging with the pivot and the edge of the driving gear around the first through hole comprises an engaging part protruding from the first surface.

According to one embodiment of the present invention, the driven gear described above comprises a second through hole for engaging with the engaging part.

According to one embodiment of the present invention, the driving gear described above comprises a groove disposed around the engaging part and the driven gear comprises a bump disposed on an inner wall of the second through hole and engaging with the groove, the bump is adapted to move along the groove when the driving gear rotates relatively to the driven gear.

According to one embodiment of the present invention, the driven gear described above comprises a groove disposed around an inner wall of the second through hole and the driving gear comprises a bump disposed on the engaging part and engaging with the groove, the bump is adapted to move along the groove when the driving gear rotates relatively to the driven gear.

According to one embodiment of the present invention, the electronic device described above further comprises a motor for driving the driving gear.

In the gear clutch assembly and the electronic device provided by the present invention, the driving gear and the driven gear are integrally formed. The driven gear only rotates with the driving gear in the driving direction and does not rotate in the opposite direction with the driving gear. The gear clutch assembly can be used in the paper feed module of the electronic device as a paper feed roller for feeding the paper into the electronic device, so the paper feed roller also only rotates in the one direction which is the paper feed direction to avoid paper jam caused by the reverse rotation of the paper feed roller. Moreover, due to the driving gear and the driven gear are integrally formed, not only the strength of the driving gear and the driven gear are improved, but also the manufacturing cost can be reduced because there's no additional parts are added for coupling the driving gear and the driven gear. The assembling process therefore becomes much simpler, and the labor cost and the scrap losses can also be reduced.

In order to make the aforementioned and other objectives, features and advantages of the present invention comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
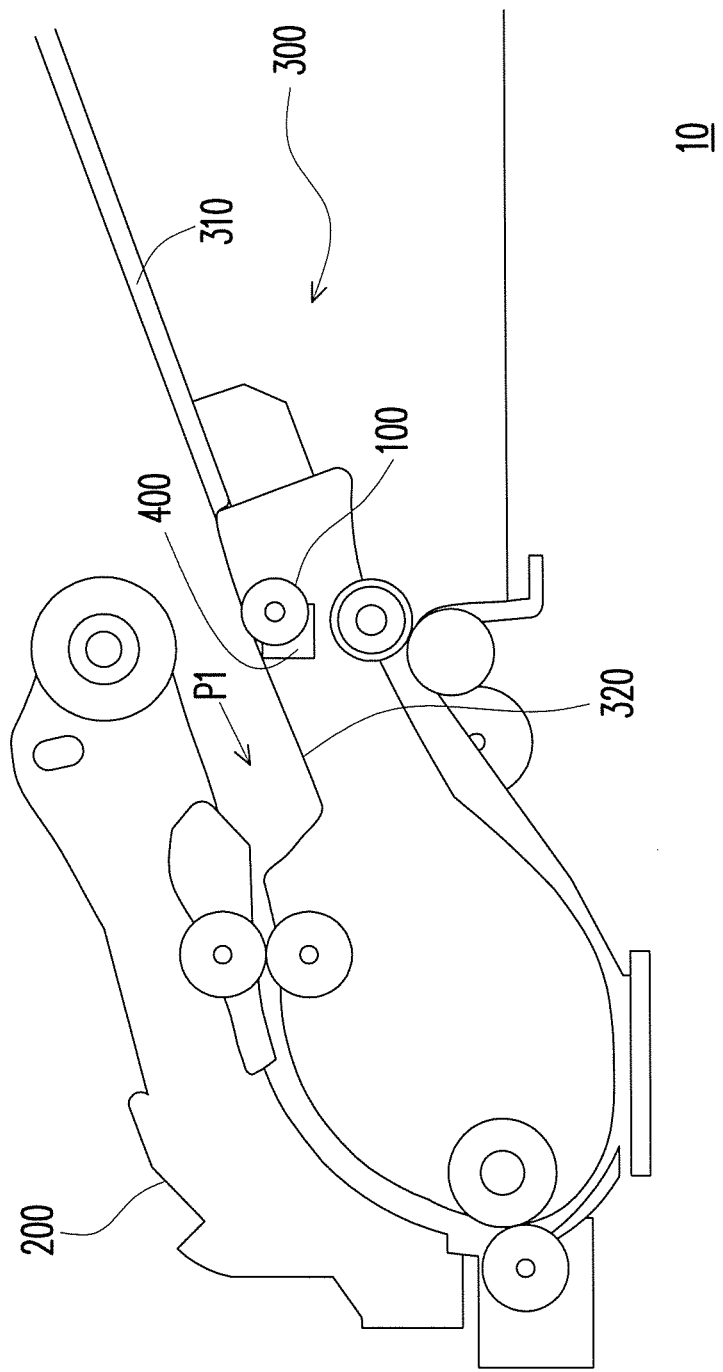
FIG. 1 illustrates a cross-section view of the electronic device according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 illustrates the electronic device according to an embodiment of the invention. Please refer to FIG. 1, one embodiment of the gear clutch assembly 100 is suitable for being used in a paper feed module 300 of an electronic device 10. The electronic device 10 can be a printer, a scanner, a multifunction peripheral, etc. In the present embodiment, the electronic device 10 is a printer, but it should be known that the embodiment is only for illustrating, not for limiting the present invention. The electronic device 10 comprises a body 200 and a paper feed module 300. The paper feed module 300 is disposed in the body 200 and comprises a paper tray 310 for stacking papers thereon, a paper feed path 320 connecting to the paper tray 310, and a gear clutch assembly 100 disposed on the paper feed path 320 for feeding the paper from the paper tray 310 into the electronic device 10 through the paper feed path 320.

Figure 2:
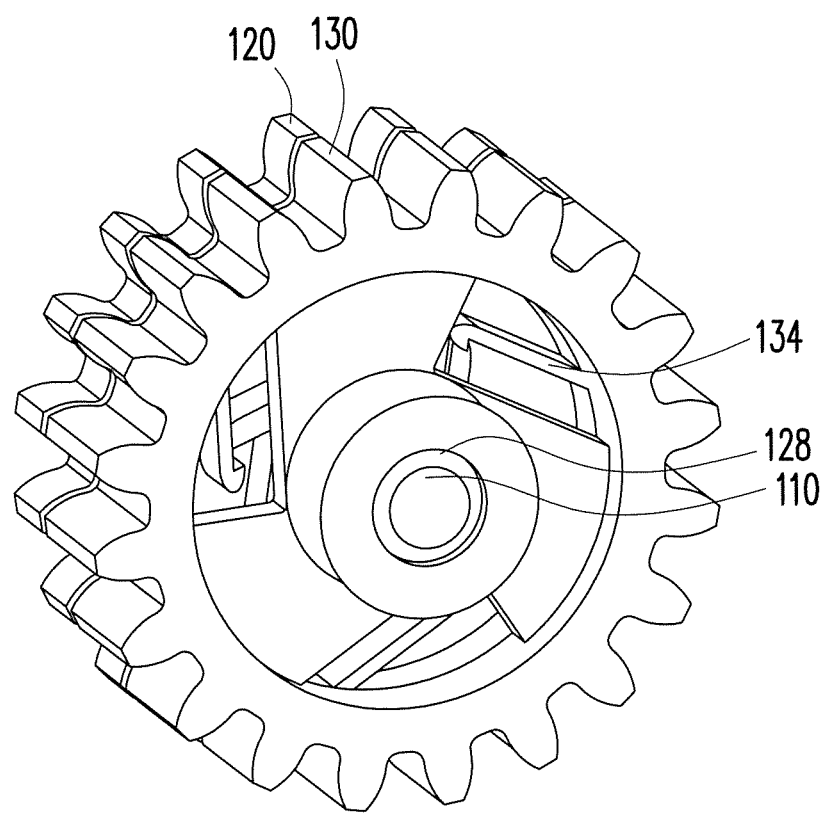
FIG. 2 illustrates the gear assembly according to an embodiment of the invention.
Figure 3:
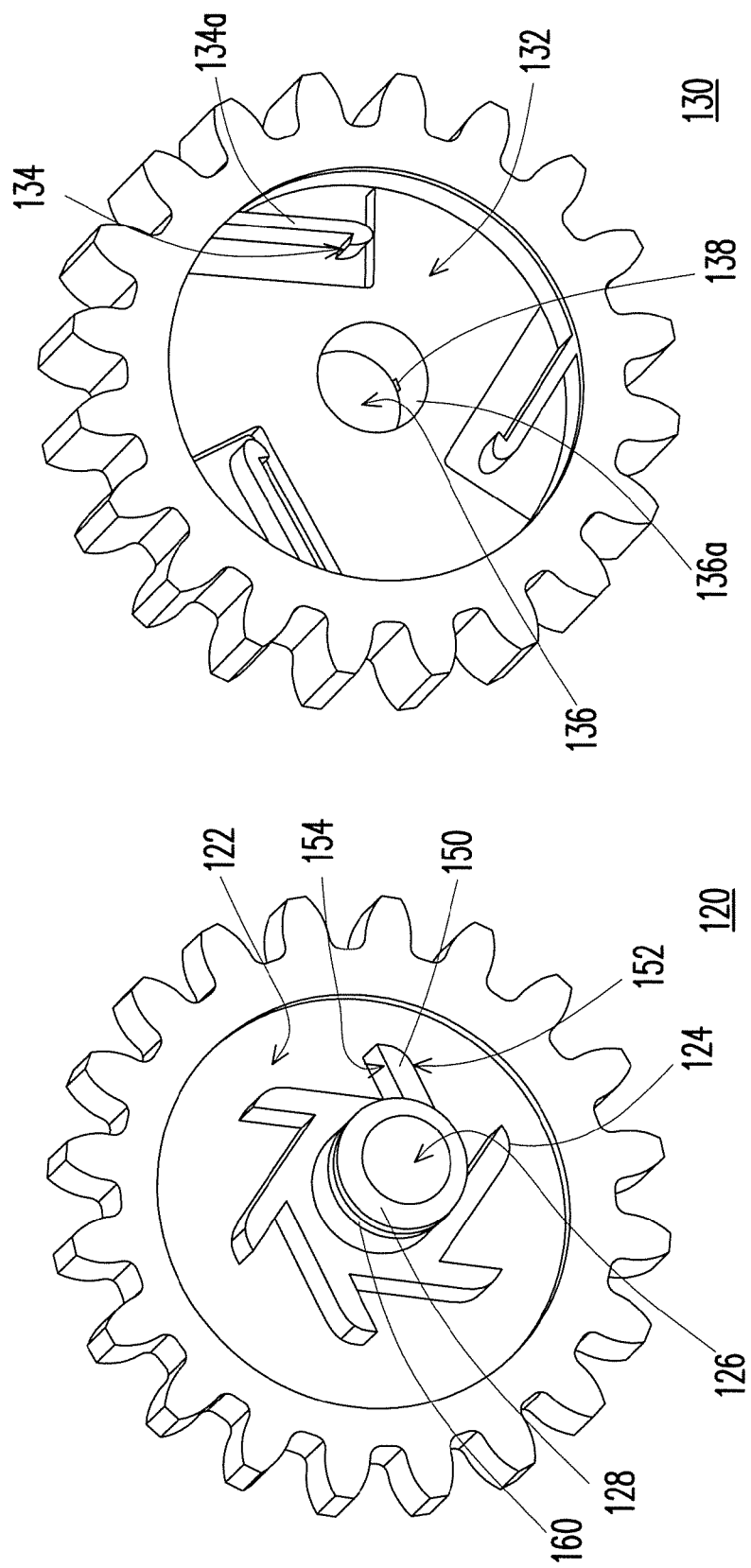
FIG. 3 illustrates the driving gear and the driven gear of FIG. 2.

FIG. 2 illustrates the gear clutch assembly according to an embodiment of the invention. FIG. 3 illustrates the driving gear and the driven gear of FIG. 2. Please refer to FIG. 2 and FIG. 3, the gear clutch assembly 100 comprises a pivot 110 which is disposed in the body 200 of the electronic device 10, a driving gear 120 engaged with the pivot 110 and adapted to rotate along the pivot 110, a driven gear 130 disposed on the driving gear 120. The driving gear 120 comprises a first surface 122, and a ratchet 124 integrally formed with the driving gear 120 on the first surface 122 and comprising a plurality of teeth 150. The driven gear 130 comprises a second surface 132 facing the first surface 122 and at least a pawl 134 which is integrally formed with the driven gear 130 on the second surface 132 and is adapted to engage with at least one of the teeth 150 of the ratchet 124.

In the present embodiment, the materials of driving gear 120 and the driven gear 130 are plastic. The driving gear 120 is integrally formed by injection molding technique, and so is the driven gear 130. Injection molding is a manufacturing process wherein the material is fed into a heated barrel, mixed, and forced into a mold cavity where it cools and hardens to the configuration of the mold cavity. The material suitable for injection molding is usually thermoplastic or thermosetting materials, for example, plastic. The advantages of injection molding includes high production rates, the ability to use a wide range of materials, low labor cost, little need to finish parts after molding, etc. Moreover, because the driving gear 120 and the driven gear 130 are integrally formed, there's no additional parts are added for coupling the driving gear and the driven gear, the manufacturing cost can be reduced and the assembling labor cost and the scrap losses are also decreased.

FIG. 3 illustrates the driving gear and the driven gear of FIG. 2. Please refer to FIG. 3, the driving gear 120 comprises a first through hole 126 for engaging with the pivot 110, and the edge of the driving gear 120 around the first through hole 126 comprises an engaging part 128 protruding from the first surface 122. The driven gear 130 comprises a second through hole 136 for engaging with the engaging part 128. As the disposition described above, the driven gear 130 is engaged with the driving gear 120 and the first surface 122 with the ratchet 124 is facing the second surface 132 with the pawl 134, therefore, the pawl 134 is adapted to engage with at least one of the teeth 150 of the ratchet 124.

Figure 4:
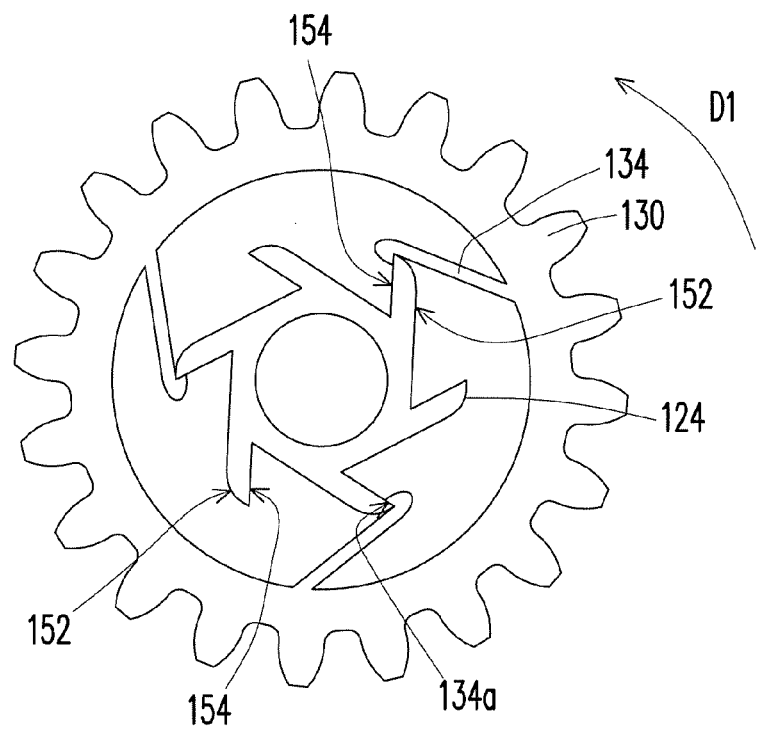
FIG. 4 illustrates a cross-sectional view of the gear assembly when the driving gear rotating in the driving direction.

FIG. 4 illustrates the gear clutch assembly when the driving gear rotating in the driving direction. Please refer to both FIG. 3 and FIG. 4, every tooth 150 comprises a curvy side 152 and a straight side 154, and the pawl 134 comprises a contact surface 134a. The straight side 154 of the tooth 150 is adapted to contact and push the contact surface 134a of the pawl 134 when the driving gear 120 is driving the driven gear 130.

When the driving gear 120 rotates in a driving direction D1, the pawl 134 catches against the straight side 154 of the first tooth 150 it encounters. In other word, when rotating in the driving direction D1, the straight side 154 of the tooth contacts the contact surface 134a of the pawl 134 and pushes the pawl 134 to rotate along with the tooth 150. The driven gear 130, therefore, rotates along with the driving gear 120.

Figure 5:
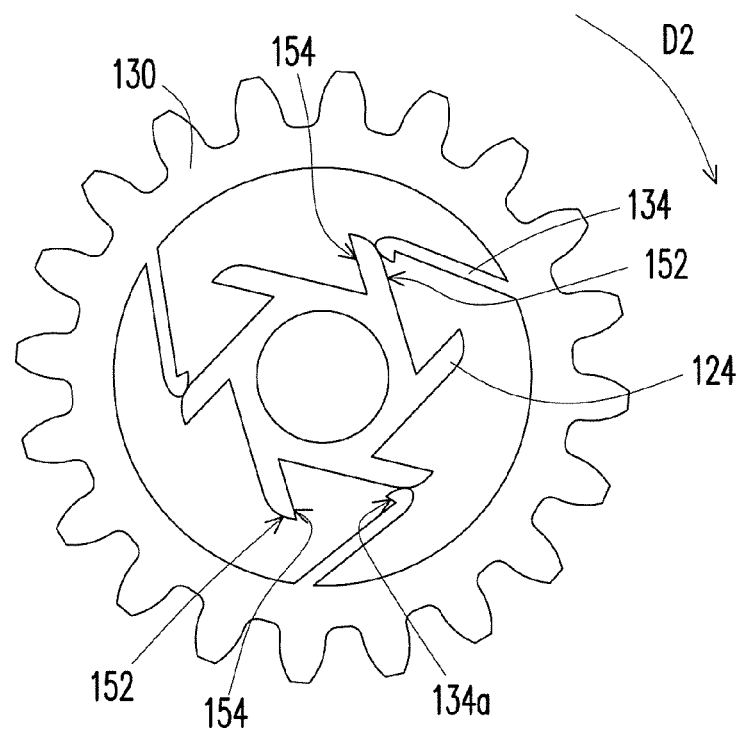
FIG. 5 illustrates a cross-sectional view of the gear assembly when the driving gear rotating in the opposite direction.

FIG. 5 illustrates the gear clutch assembly when the driving gear rotating in the opposite direction. Please refer to both FIG. 3 and FIG. 5, when the driving gear 120 rotates in an opposite direction D2 which is opposite to the driving direction D1, the pawl 134 is pushed up and slid under by the curve side 152 of every tooth 150 it encounters. In other word, when rotating in the opposite direction D2, every curve side 152 of the tooth 150 pushes up and slides under the pawl 134. Therefore, when the driving gear rotates in the opposite direction D2, the driven gear 130 does not rotate along with the driving gear 120. What is noticeable is, because the pawl 134 is integrally formed with the driven gear 130, the pawl 134 has greater strength to endure being pushed up by every tooth 150 and bouncing back repeatedly, and also has less possibility to break at the joint.

Figure 6:
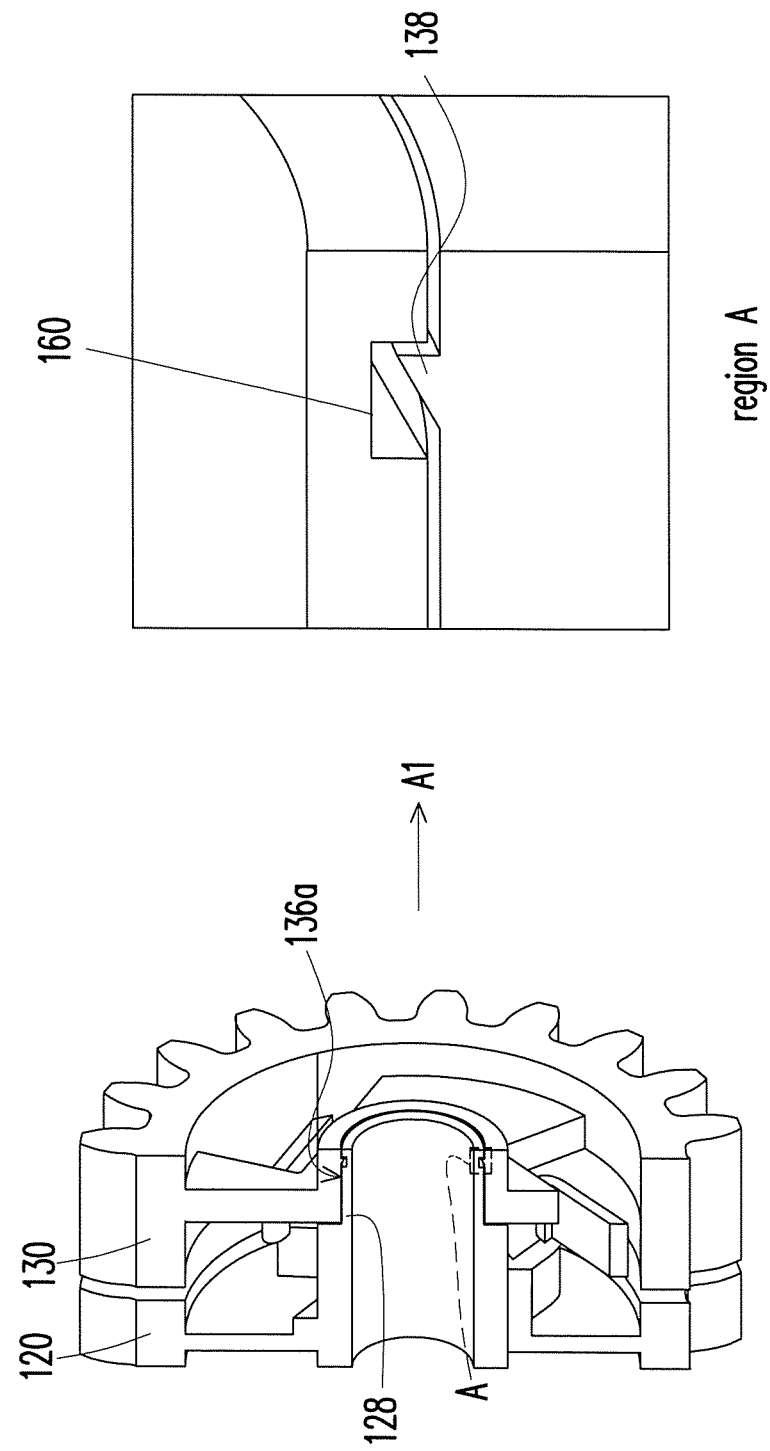
FIG. 6 illustrates another cross-sectional view of the gear assembly of FIG. 2.

FIG. 6 illustrates another cross-sectional view of the gear clutch assembly of FIG. 2 and the enlarged view of region A. Please refer to FIG. 6, the driving gear 120 comprises a groove 160 disposed around the engaging part 128 and the driven gear 130 comprises a bump 138 disposed on an inner wall 136a of the second through hole 136 and engaging with the groove 160. The bump 138 is adapted to move along the groove 160 when the driving gear 120 rotates relatively to the driven gear 130. In other embodiment which is not shown in the figures of the present invention, the driven gear comprises a groove disposed around an inner wall of the second through hole and the driving gear comprises a bump disposed on the engaging part and engaging with the groove. The bump is adapted to move along the groove when the driving gear rotates relatively to the driven gear. Therefore, the engagement of the groove 160 and the bump 138 limits the movement of the driving gear 130 along a first axis A1, so the driving gear 120 and the driven gear 130 can stay engaged with each other, and yet the engagement of the groove 160 and the bump 138 allows the driving gear 120 rotating around the first axis A1 relatively to the driven gear 130.

As shown in FIG. 1, when the gear clutch assembly 100 is used in the paper feed module 300 of the electronic device 10, the electronic device 10 further comprises a motor 400 for driving the driving gear 120, and the driven gear 130 can be used as a paper feed roller since the driven gear 130 only rotates in the driving direction D1. Therefore, the paper on top of the driven gear 130 can only be delivered in a paper feed direction P1. In other embodiment of the present invention, the paper feed roller can also be another gear engaged with the driven gear 130 except the driving gear 120. The gear engaged with the driven gear 130 also only rotates in one direction since the gear is driven by the driven gear 130.

As the disposition described above, the paper feed roller can only rotate in one direction, so when the motor 400 drives the driving gear 120 to rotate in the opposite direction D2, the paper feed roller will not rotate with the driving gear 120. Therefore, the paper feed module 300 will not feed the paper in the direction opposite to the paper feed direction P1 and causes paper jam.

In summary, the present invention provides a gear clutch assembly and an electronic device using the same, wherein the driving gear is integrally formed and so is the driven gear. The driven gear can only rotates with the driving gear in the driving direction and does not rotate with the driving gear in the opposite direction due to the design of the pawl and the ratchet. The gear clutch assembly can be used in the paper feed module of the electronic device as a paper feed roller, so the paper feed roller also only rotates in one direction to avoid paper jam caused by the reverse rotation of the paper feed roller. Because the driving gear and the driven gear are integrally formed, not only the strength of the driving gear and the driven gear are improved, but also because there's no additional parts are added for coupling the driving gear and the driven gear, the manufacturing cost can be reduced and the assembling process becomes much simpler. Therefore, the labor cost and the scrap losses can also be reduced.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A gear clutch assembly, comprising:
   a pivot;
   a driving gear engaged with the pivot and adapted to rotating along the pivot, comprising:
      a first surface;
      a ratchet integrally formed with the driving gear comprising a plurality of teeth disposed on the first surface;
      a first through hole for engaging with the pivot;
      an edge of the driving gear including an engaging part protruding from the first surface around the first through hole; and
      a groove disposed around the engaging part;
   a driven gear disposed on the driving gear, comprising:
      a second surface facing the first surface;
      at least a pawl integrally formed with the driven gear on the second surface;
      a second through hole for engaging with the engaging part; and
      a bump disposed around an inner wall of the second through hole and engaging with the groove, and the bump adapted to move along the groove when the driving gear rotates relatively to the driven gear,
   when the driving gear rotates in a driving direction, at least one of the teeth of the ratchet is engaged with the pawl and drives the driven gear to rotates with the driving gear, when the driving gear rotates in an opposite direction, every tooth pushes up and slides under the pawl so the driven gear does not rotate along with the driving gear.

2. The gear clutch assembly as claimed in claim 1, wherein the ratchet and the driving gear are integrally formed by injection molding.

3. The gear clutch assembly as claimed in claim 1, wherein the pawl and the driven gear are integrally formed by injection molding.

4. The gear clutch assembly as claimed in claim 1, wherein the driving gear and the driven gear are made of plastic.

5. The gear clutch assembly as claimed in claim 1, wherein every tooth comprises a curvy side and a straight side, the pawl comprises a contact surface, the straight side of the tooth is adapted to engage with the contact surface and push the contact surface when the driving gear rotates in the driving direction, and the curve side of the tooth is adapted to push up and slide under the pawl when the driving gear rotates in the opposite direction.

6. An electronic device, comprising:
   a body; and
   a paper feed module disposed in the body, comprising:
      a paper tray for stacking papers thereon;
      a paper feed path connecting to the paper tray; and
      a gear clutch assembly disposed on the paper feed path, comprising:
         a pivot disposed in the body;
         a driving gear engaged with the pivot and adapted to rotate along the pivot, comprising:
            a first surface;
            a ratchet integrally formed with the driving gear comprising a plurality of teeth disposed on the first surface;
            a first through hole for engaging with the pivot;
            an edge of the driving gear including an engaging part protruding from the first surface around the first through hole; and
            a groove disposed around the engaging part;
         a driven gear disposed on the driving gear, comprising:
            a second surface facing the first surface;
            at least a pawl integrally formed with the driven gear on the second surface;
            a second through hole for engaging with the engaging part; and
            a bump disposed around an inner wall of the second through hole and engaging with the groove, and the bump adapted to move along the groove when the driving gear rotates relatively to the driven gear,
         when the driving gear rotates in a driving direction, at least one of the teeth of the ratchet is engaged with the pawl and drives the driven gear to rotate with the driving gear, when the driving gear rotates in an opposite direction, every tooth pushes up and slides under the pawl so the driven gear does not rotate along with the driving gear.

7. The electronic device as claimed in claim 6, the ratchet and the driving gear are integrally formed by injection molding.

8. The electronic device as claimed in claim 6, wherein the pawl and the driven gear are integrally formed by injection molding.

9. The electronic device as claimed in claim 6, wherein the driving gear and the driven gear are made of plastic.

10. The electronic device as claimed in claim 6, wherein every tooth comprises a curvy side and a straight side, the pawl comprises a contact surface, the straight side of the tooth is adapted to engage with the contact surface and push the contact surface when the driving gear rotates in the driving direction, and the curve side of the tooth is adapted to push up and slide under the pawl when the driving gear rotates in the opposite direction.

11. The electronic device as claimed in claim 6, wherein the electronic device further comprises a motor for driving the driving gear.

12. A gear clutch assembly, comprising:
a pivot;
a driving gear engaged with the pivot and adapted to rotating along the pivot, comprising:
   a first surface;
   a ratchet integrally formed with the driving gear comprising a plurality of teeth disposed on the first surface;
   a first through hole for engaging with the pivot;
   an edge of the driving gear including an engaging part protruding from the first surface around the first through hole; and
   a bump disposed on the engaging part;
a driven gear disposed on the driving gear, comprising:
   a second surface facing the first surface;
   at least a pawl integrally formed with the driven gear on the second surface;
   a second through hole for engaging with the engaging part; and
   a groove disposed around an inner wall of the second through hole, the bump engaging with the groove and adapted to move along the groove when the driving gear rotates relatively to the driven gear,
when the driving gear rotates in a driving direction, at least one of the teeth of the ratchet is engaged with the pawl and drives the driven gear to rotate with the driving gear, when the driving gear rotates in an opposite direction, every tooth pushes up and slides under the pawl so the driven gear does not rotate along with the driving gear.

13. An electronic device, comprising:
a body; and
a paper feed module disposed in the body, comprising:
   a paper tray for stacking papers thereon;
   a paper feed path connecting to the paper tray; and
   a gear clutch assembly disposed on the paper feed path, comprising:
      a pivot disposed in the body;
      a driving gear engaged with the pivot and adapted to rotate along the pivot, comprising:
         a first surface;
         a ratchet integrally formed with the driving gear comprising a plurality of teeth disposed on the first surface;
         a first through hole for engaging with the pivot;
         an edge of the driving gear including an engaging part protruding from the first surface around the first through hole; and
         a bump disposed on the engaging part;
      a driven gear disposed on the driving gear, comprising:
         a second surface facing the first surface;
         at least a pawl integrally formed with the driven gear on the second surface; and
         a groove disposed around an inner wall of the second through hole, the bump engaging with the groove and adapted to move along the groove when the driving gear rotates relatively to the driven gear,
   when the driving gear rotates in a driving direction, at least one of the teeth of the ratchet is engaged with the pawl and drives the driven gear to rotate with the driving gear, when the driving gear rotates in an opposite direction, every tooth pushes up and slides under the pawl so the driven gear does not rotate along with the driving gear.

* * * * *